Sept. 6, 1966  L. S. MAGOR  3,270,619
CONTROL SYSTEM

Filed June 2, 1965  3 Sheets-Sheet 1

INVENTOR
LINCOLN S. MAGOR

BY~ *Westell & Hanley*

INVENTOR
LINCOLN S. MAGOR

BY Westell & Hanley

Sept. 6, 1966  L. S. MAGOR  3,270,619
CONTROL SYSTEM

Filed June 2, 1965  3 Sheets-Sheet 3

INVENTOR
LINCOLN S. MAGOR

BY~ *Westell & Hanley*

3,270,619
CONTROL SYSTEM
Lincoln S. Magor, Galt, Ontario, Canada, assignor to
Mimik Limited, Galt, Ontario, Canada
Filed June 2, 1965, Ser. No. 460,682
9 Claims. (Cl. 90—13.5)

This invention relates to a control system and control apparatus of most probable use with machine tools.

This application deals with an improvement on my invention entitled Control System, described in United States application Serial Number 390,631, filed August 19, 1964.

It is an object of this invention to provide means allowing a machine tool to trace completely about the perimeter of a pattern.

It is an object of this invention to provide a hydraulic control system which, in contrast to previous systems of the same type, is fully automatic, and requires no guidance of the stylus by the operator.

It is an object of this invention to provide a control means for attachment to a machine tool, wherein the relative movements of a tool and workpiece are connected to correspond to the relative movements of a pattern and tracer, and wherein a sensing device, usually a stylus, forming part of said tracer, controls such relative movement in two directions in accord with its deflection, said sensing device being biased by an orientable biasing means and deflectable against said bias by the pattern. Means are provided for obtaining a physical value which is a measure of the amount of deflection of the sensing device from a neutral position. The device is so designed that when such deflection exceeds a predetermined amount, the stylus has been deflected by the bias rather than the workpiece, and means are provided to rotate said biasing means in one direction, the result of such rotation being that said stylus is redirected relatively toward the pattern, and the tool is correspondingly redirected relatively toward the workpiece. When the said deflection is less than a predetermined amount (which may be the same predetermined amount as formerly or may be space downwardly therefrom, at the cost of sensitivity), the stylus has been deflected against the bias by the pattern, and the rotation means rotate said bias in the opposite direction which will act to redirect the stylus along the direction of the pattern, and the tool along the desired contour to be cut in the workpiece. In the result, when the stylus is following a convex radius or curve, the bias tends to continually increase deflection which causes the bias rotation means to turn in the general direction of the contours, or towards the pattern. When tracing a concave radius or curve the pattern opposes the bias and reduces deflection, causing the bias rotating means to again follow the general direction of the curve, but in this instance, away from the pattern.

It is an object of this invention to provide means, mechanically connected to the stylus to move in accord with the deflection to cause rotation of the biasing means in the manner, and for the purposes described in the preceding paragraph.

It is an object of this invention to provide a relatively movable hydraulic valve and spool whose relative movement is controlled by a mechanical connection to the stylus and wherein the valve is connected to control rotation of an hydraulic motor which is designed to supply the desired rotation to said biasing means.

In drawings which illustrate a preferred embodiment of the invention:

Figure 1:
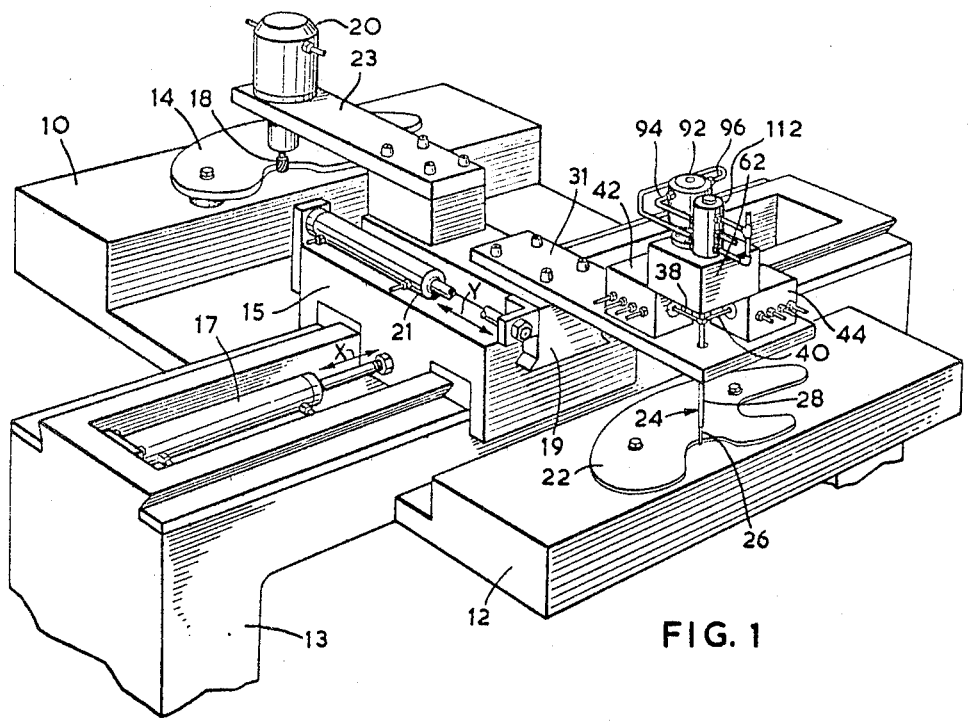
FIGURE 1 illustrates a view of the mechanical arrangement of the system.

Mounted on a platform 10 is a workpiece blank 14 which is to be operated upon by a cutting tool 18 moving relative thereto, while platform 12 mounts a pattern 22 around the full periphery of which will relatively move a tracing element, preferably a stylus 24. The cutting tool is mounted to be driven by motor 20 which rests on arm 23 which is mounted on carriage 19.

In any form of the invention the relative movement between the cutting tool and workpiece corresponds to relative movement between the pattern 22 and the stylus 24. In the form of the invention shown, the pattern and workpiece are stationary while the tool and stylus move together. It will be realized that the same results can be achieved if the stylus and tool are stationary while the pattern and workpiece move together. Further, the pattern and the tool, on the one hand, could move relative to the stylus and the workpiece, on the other hand, but in this event, the tool would produce on the workpiece a mirror image of the pattern. However all these alternative means of operation are considered within the scope of the invention and the control means shown will operate equally efficiently with them.

The platforms 10 and 12 are mounted on base 13. Slidably mounted on base 13 to be moved in what will sometimes be referred to as the X direction is a carriage 15 connected to be moved in either sense in the X direction by a piston 17 whose cylinder is connected to the base 13 and whose rod is connected to carriage 15. Slidably mounted on carriage 15 to be moved in what will sometimes be referred to as the Y direction (which is perpendicular to the direction of sliding of carriage 15 on base 13) is a carriage 19 connected to be moved in either sense in the Y direction by a piston 21 whose cylinder is connected to carriage 15 and whose rod is connected to carriage 19. Thus by a proper combination of relative movement caused by pistons 21 and 17 the carriage 19 may be caused to move in any direction relative to pattern 22 and workpiece 14 about a 360° range in the plane defined by the directions in which carriages 15 and 19 slide.

It will be noted that the advantages of the invention or its scope are not affected if the pistons 21 and 17 are replaced by hydraulic motors.

The stylus 24 embodies the operative part of the means for tracing the pattern, and is provided with a sensing tip 26, a shank 28 and a spherical enlargement 27 remote from the sensing tip 26. A mounting plate 31 is supported on carriage 19 and on the lower surface of plate 31 is removably mounted a block 34. The plate 31 and block 34 contain an aligned passage 32 therethrough, large enough to receive the shank 28 passing therethrough with sufficient clearance for deflection of the stylus 24 as hereinafter described.

The facing surfaces of the plate 31 and block 34 define a cavity which has the shape of a surface of revolution dimensioned to slidably contact the spherical enlargement 27 of the stylus shank 28 along circles above and below the widest circle of the sphere 27, such circles of control being measured on a plane perpendicular to the longitudinal axis of the shank. It will be appreciated that the function of the type of stylus mounting shown is to allow universal movement of the shank 28 in a conical locus centered about the axis of passage 32. The passageway 32 above and below the cavity is therefore sufficiently larger than the shank 28 to allow it to move through the desired cone of movement.

It will be obvious that the cavity described, acts simply as a universal mounting for the shank 28 and that different and/or more elaborate universal mountings may be used if desired.

Above the spherical enlargement, flexible, but self sustaining rods 38 and 40 extend, in directions substantially perpendicular to each other and to the median position of the axis of the shank 28, to the operating spools of a pair of two-way valves 42 and 44.

The design of the two valves 42 and 44 is the same and these are of conventional and well known design. Each valve comprises a sleeve and a relatively axially movable spool therein, and in the embodiment shown, the sleeves are both mounted on the plate 31 while the spools are movable by rods 38 and 40 respectively, with the stylus.

The operation of valve 44 controlling movement through piston 17 of carriage 15 in the X direction; and the operation of valve 42 controlling movement through piston 21 of carriage 19 in the Y direction is in accord with well known valve design. The sleeve of valve 44 receives supply fluid and on movement of the valve spool in one direction sends such supply fluid to one end of cylinder 17 to move the carriages 15 and 19 in one sense in the X direction; and on movement of the valve spool in the other direction sends such supply fluid to the other end of cylinder 17 to move the carriages 15 and 19 in the opposite sense in the X direction. The return fluid from cylinder 17 is simultaneously sent by the valve to a return line therefrom. The sleeve of valve 42 similarly receives supply fluid and has a return line, and depending on the deflection of the valve spool from a median position, the fluid is used to move carriage 19 in one or the other relative direction. Moreover, in accord with the well known construction of these valves the speed of movement of carriage 19 in the Y direction in either direction varies with the extent of displacement of the spool of valve 42 from its neutral position in the sleeve, and the speed of movement of carriages 15 and 19 in the X direction varies with the extent of displacement of the valve 44 from its neutral position in the sleeve.

Figure 3:
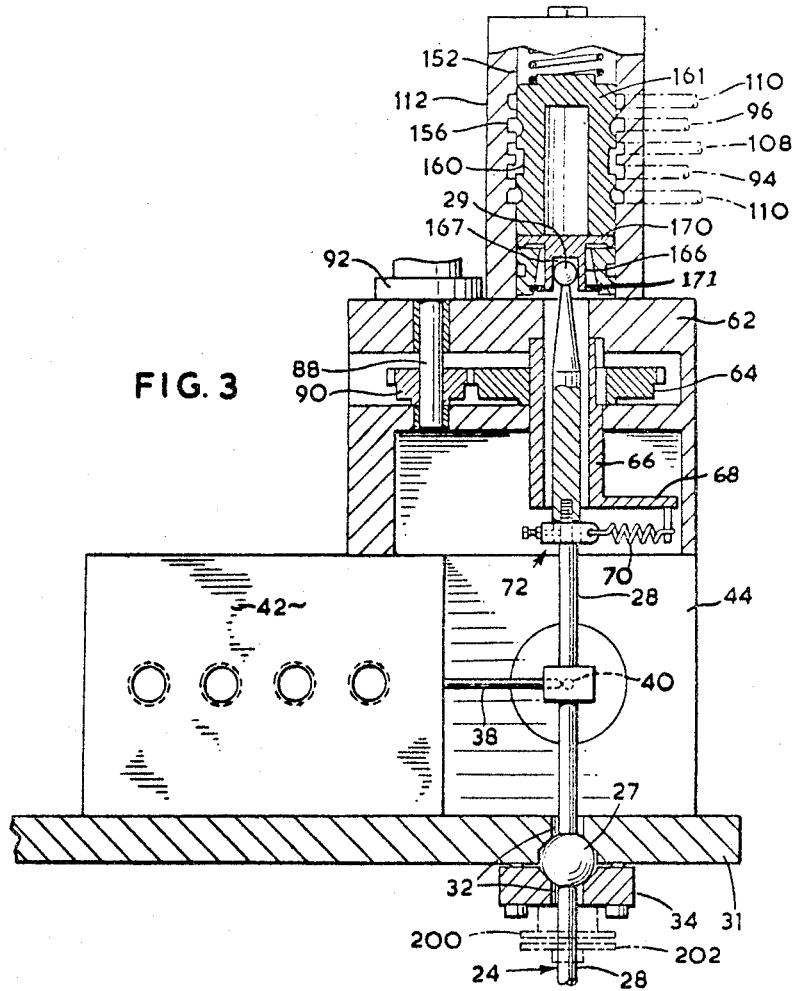
FIGURE 3 illustrates the biasing, and biasing orientation control in the tracer.
Figure 4:
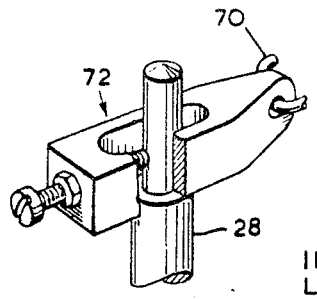
FIGURE 4 illustrates a detail of the biasing system.

In FIGURE 3 is shown means for biasing the stylus 24 in a plane defined by the neutral position of the shank 28 thereof and this comprises a control housing 62 mounted on the plate 31 and rotatably mounting in a suitable cavity therefor a gear 64 concentrically located over the neutral axis of the stylus 24. Rotatable with the gear 64 is a hollow tube 66 extending downwardly from the housing 62 toward the stylus. Adjacent the stylus a radial arm 68 extends outwardly from tube 66 to mount one end of a tension spring 70 which extends radially inward therefrom with its inner end attached to the upper end of the stylus shank 28 whereby the stylus 24 when unaffected by the pattern bearing on the stylus tip 26 will be deflected in the plane defined by the direction in which the spring 70 extends from the shank 28 and by the neutral position of shank 28. Means 72 are schematically shown for adjusting the spring 70 tension, but it will be appreciated that such tension may be limited in any manner desired.

The casing 62 also rotatably mounts a shaft 88 extending upwardly out of the casing and there is mounted to rotate thereon, a gear 90 meshing with the spring bias orientation gear 64. Mounted on the housing 62 is an hydraulic motor 92, having a pair of hydraulic lines 94 and 96 thereto, the hydraulic motor 92 being of the type wherein the choice of one of the lines 94 or 96 as the supply line, and the other as the return line, determine the sense of rotation of the motor 92, and hence through the gear drive 90–64 the direction of re-orientation of redirection of the biasing to the stylus 24 as applied by the biasing spring 70. The control of these lines 94 and 96 is supplied by a deflection sensing means to be described hereafter. In this manner orientation means for the stylus bias is supplied.

In FIGURE 3 is shown the means for controlling the orientation of the stylus biasing means through control of motor 92 and of the flow to lines 94 and 96. Here, as opposed to the specific embodiment shown in my prior application Ser. No. 390,631, filed August 19, 1964, the deflection of the stylus is directly measured. The invention herein shown has been found to give more uniform operation about the 360 degrees of the periphery of the pattern than the means shown in the specific embodiment of the application Ser. No. 390,631.

Figure 6:
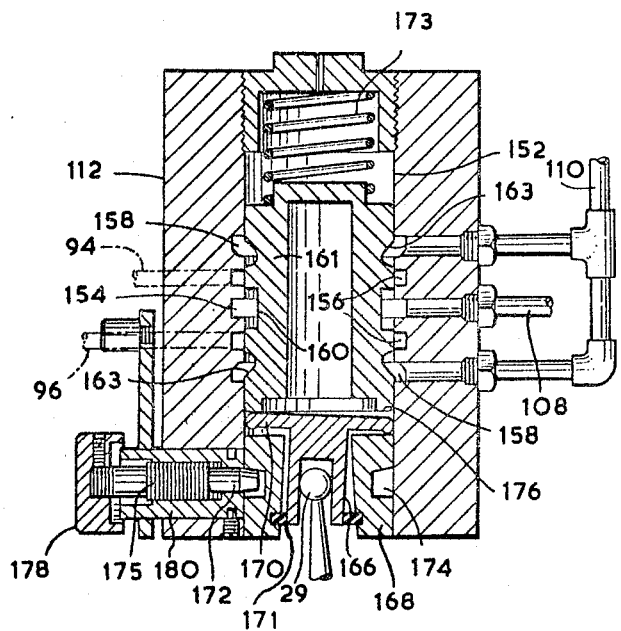
FIGURE 6 illustrates an enlarged view of the valve used in the control of the biasing means.

In the embodiment shown, a valve 112 (which is internally constructed as shown in FIGURE 6) is mounted directly over the stylus shank 28 and with the axis of the valve generally aligned with the neutral position of the stylus shank.

Valve 112 (shown in FIGURE 6) is a spool valve, constructed somewhat similarly to the X and Y valves discussed but valve 112 is used in a somewhat unconventional manner. The sleeve 152 of valve 112 has five grooves extending about the inner surface thereof and symmetrically distributed in relation to each other along its axial length. The central groove 154 is a supply groove connected to a hydraulic supply line 108 from a source not shown. The groove 154 is connectible to one of the two adjacent sleeve grooves 156 by movement of the central groove 160 in the spool 161. The two outer sleeve grooves 158 are return grooves connected by line 110 to a sump not shown. The spool 161 has three grooves axially symmetrically located therealong with the outside grooves 163 dimensioned to connect one or the other of grooves 156 to the sump line 110 simultaneously with the connection of the other groove 156 to central groove 154 through central spool groove 160. The grooves 156 are respectively connected to lines 94 and 96 to rotate the motor 92 in one or the other direction depending on which groove 156 is connected to the supply line 108.

The spool and sleeve grooves are designed so that there is no connection of the supply line 108 to either line 94 or 96 in the median position of the spool 161, i.e. in this position the supply line groove 154 is unconnected to either groove 156 by spool groove 160 with the latter in the median position.

A shank 166 projects into one end of main valve bore 152 which shank 166 in turn is mounted with a small clearance in the bore of a retainer 168 slidable in the valve bore 152. The clearance between the inner bore of retainer 168 and the outer surface of the shank 166 (much exaggerated in the drawings) allows relative tilting between the axis of the shank 166 and the bore in sleeve 152, which tilting as hereinafter described, is used to operate the valve. The shank 166 projecting through the retainer 168 toward the spool 161 is provided with a plate 170 facing shoulders 176 on the spool 161 and the spool 161 with these shoulders is biased against the plate 170 by compression spring 173 bearing at one end on a plate at the end of the bore 152 remote from the retainer 168 and at the other end on the spool 161. Shoulders 176 on the side of the spool 161 facing plate 170 form a bearing surface in a plane perpendicular to the spool axis, and the plate 170 under control of the stylus, as hereinafter described, is designed in one position to have its surface facing shoulders 176 in a parallel orientation (as shown in FIGURE 3), and it will be seen that the spool 161 will be moved by the spring 173, farthest in the direction of the retainer 168 when the shoulders 176, and the facing surface of plate 170, are parallel.

Shank 166 is lightly resiliently centered in the bore of retainer 168 by a resilient washer 171 bearing on shank 166 and seated in grooves in the bore of retainer 168. Washer 171 is flexible enough to conform to lateral deflections of shank 166 by ball 29.

Adjustment of the relative positions of spool 161 and retainer 168, and hence of the relative position of grooves 160 and 163, on the one hand and grooves 154, 156 and 158 on the other hand, when shoulders 176 and the facing surface of plate 170 are parallel, is achieved by a conical tapered end on stud 172 projecting radially into an exterior peripheral groove 174 in retainer 168 which groove 174 is slightly wider than the conical end of stud 172. The stud 172 is mounted on the end of a threaded shank 175 controlled by knob 178 and the shank is threadably monuted (eccentrically) in a cylindrical sleeve 180 which is rotatably slidably mounted in the valve casing. The axial location of the plate 170 in its position parallel to shoulders 176 may therefore be set under the bias of spring 173 by the adjustment of the sleeve 180, through a control handle, moving the stud 172 in axial directions (relative to the axis of spool 161) causing consequent movement of the retainer 168 which forms the fulcrum for plate 170 and hence the valve spool 161.

Fine adjustment is achieved by adjustment of the threaded shank 175 through knob 178 which adjusts in and out and varies the diameter of that part of the stud 172 which contacts the retainer 168.

The upper end of shank 28 is extended upwardly out of housing 62 and passes through the bore in the housing 62 with sufficient clearance that it may, allow deflection of the stylus on each side of those design limits within which it is desired that the motor 92 shall not rotate.

The plate 170 is mounted on shank 166 as stated and the shank 166 is at its lower end provided with a downwardly open cylindrical socket 167 which receives a ball 29 on the upper end of stylus shank 28.

Figure 2:
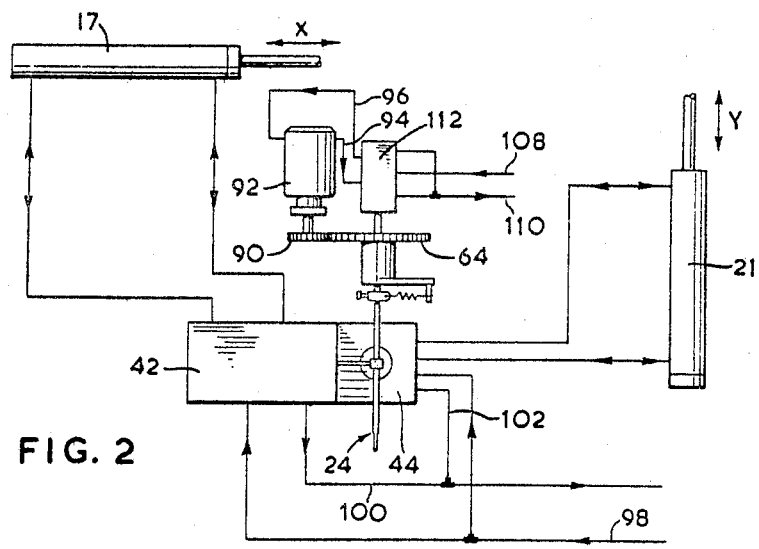
FIGURE 2 illustrates the hydraulic arrangement of the system.

The shank 166 is designed so that when the downwardly opening socket 167 is positioned by the ball 29 (through the stylus being in its undeflected position) the plate 170 will be perpendicular to the valve axis, hence the spool and valve will be so arranged that at this limit of movement (this position is shown in FIGURE 6) the supply line 108 will be connected by groove 160 to the groove 156 nearer to plate 170 to cause (for general counterclockwise travel around the pattern) motor 92 to rotate the bias of spring 70 in the clockwise direction to tend to increase its deflection. The consequent deflection of the stylus from the undeflected position will thus deflect the ball 29 and socket 167 deflecting the shank 166 and plate 170 to a degree varying with the amount of deflection of the stylus. This, in accord with the previously described operation of the valve, will cause deflection of spool 161 in the direction away from the stylus whereby with progressively increasing amounts of deflection of the stylus from the undeflected position, the spool 161 passes from its position connecting supply 108 to that groove 156 which is nearer stylus 24 (for clockwise rotation of bias spring 70) through the median position, where supply 108 is connected to neither groove 156 (this relative spool-sleeve position, corresponding to the desired stylus deflection); and to the opposite position, where supply 108 is connected to the groove 156 farther from stylus 24 to cause counterclockwise rotation of spring 70. (As explained with the previous embodiment, for overall clockwise movement of the stylus around the pattern, the connections of lines 94 and 96 to valve 112 would be reversed, hence, conversely to the above description movement of the spool toward the stylus beyond the median position would, in such converse arrangement, cause counterclockwise rotation of the stylus bias and movement of the spool away from the stylus beyond the median position will cause clockwise rotation of the bias spring 70.) However, returning to the embodiment being described where the system is connected for general counterclockwise movement around the pattern, reference to the previous discussion and to FIGURE 2 will indicate that with the valve 112 as illustrated in FIGURE 6 mounted above and operated directly by the stylus, the connections are from supply line 108 to groove 154 and from return line 110 to grooves 158 and grooves 156 are connected to lines 94 and 96.

It will be noted that the median position for the relative positions of spool 161 and retainer 168 (i.e. the position where groove 154 is unconnected to either groove 156), corresponds to the desired deflection of the stylus 24, deflection being measured relative to the neutral position as shown in FIGURE 3. The median position of the spool and retainer and hence the desired deflection of the stylus 24 may thus be adjusted through the coarse and fine adjustments of the conical end of stud 172 which adjusts the axial position of retainer 168.

It will be noted that feed rate adjustment i.e. control of the speed of movement of the stylus about the pattern and of the tool about the workpiece, may be achieved by adjustment of the axial position of retainer 168. Thus if retainer 168 is adjusted axially along the valve toward the stylus, the stylus-remote surface of retainer 168 sets the limit of movement for spool 161, toward the stylus, at the point where plate 170 is perpendicular to the valve axis, i.e. with the stylus undeflected. Since as a result of the above adjustment, this limit has moved farther from the median position of spool 161 in valve 112, the necessary deflection of the stylus 24 from the neutral position to move spool 161 to the median position is increased. Since the deflection of stylus is greater, the flow through the X and Y valves 42 and 44 (or one of them where the movement direction coincides with the X and Y axis) is increased at the median position of spool and retainer, and hence the feed rate is increased.

Conversely the feed rate is decreased by adjusting the position of retainer 168 along the valve away from the stylus which has the effect of lessening the deflection of stylus 24 required to move the spool 161 to the median position. Since the deflection of the stylus 24 at the median position is decreased, the consequent flow through the X and Y valves 42 and 44, or one of them is decreased, decreasing the feed rate.

The pressure of the stylus spring 70 tending to deflect the stylus from its undeflected position is of course opposed in its effect on the stylus by the compression spring 173 which biases spool 161 toward plate 170 tending to rotate the plate and hence stylus 24 to the undeflected position. For adjustment to various modes of operation therefore, means (not shown) will often be provided for adjusting the compression of spring 173.

In FIGURE 3 is shown in dotted form a means for adapting the apparatus shown for manual feed. Under manual feed conditions the operation of valve 112, motor 92 and the hydraulic lines associated therewith, for directing the workpiece around the model, is dispensed with and hence these elements are disconnected. Thus, during manual operation, a limit on stylus deflection must be provided so that the feed rate cannot, through a manual operating error, be rendered excessive. For manual operation therefore, a collar with flange 200 may be attached to stylus shank 28, arranged, to be facing and adjacent a facing annular flange 202 mounted on block 34. The flanges 200 and 202 are equally spaced about their respective peripheries when the stylus is undeflected. When the stylus is deflected to the predetermined desired maximum in any direction, the flanges 200 and 202 will contact and prevent further deflection of the stylus. One of the flanges (here the flange 200 on its collar on stylus 28) is made adjustable relative to the other to allow the varying of the maximum manual adjustment, and this may be achieved (for example) by threadably mounting the collar on the stylus and calibrating it so that rotation of the collar may be measured in terms of maximum angular stylus deflection.

*Operation*

In operation; the pattern 22 is firmly mounted on table 12, and the workpiece on table 14; the stylus 24 is set in contact with the pattern 22 and the tool 18 in contact with the workpiece 14. The orientation of stylus 24, biasing arm 68 and spring 70, will be adjusted (by adjustment of the conical end of stud 172) so that the desired angle of bias of the stylus 24 will be between 20 and 40 degrees inwardly (i.e. counterclockwise in the direction of motion) relative to the tangent to the pattern 22 at point of contact therewith, the angle being measured from the tangent to biasing direction in the sense in which it is desired that the stylus 24 travel around the pattern; herein let it be assumed that this is counterclockwise.

The flow sensor sensitivity is determined by the setting of the spool 161 which is adjusted to be in the median position in sleeve 152 at the desired stylus deflection (referred to herein as median deflection although not at zero deflection) as determined by the bias of the spring 70 and the pressure of the pattern on the stylus. Set in this way with the hydraulic supplies operating, the stylus 24 will tend to follow a straight line path along the pattern since no flow will be taking place in either line 94 or line 96 to rotate motor 92 in either direction, and the tool will cut along a corresponding straight path in the workpiece. Further a deflection of the stylus 24 from the median position will cause a resultant change in operation of the X and/or Y valves 42 and 44 which are operated by stylus 24 as described, which will tend to cause the stylus 24 with its mounting to move in such a direction that its angle of contact with the pattern will cause it to return to its median position, and it will be noted that such movement of stylus and mounting will be in the direction of such deflection.

Figure 5:
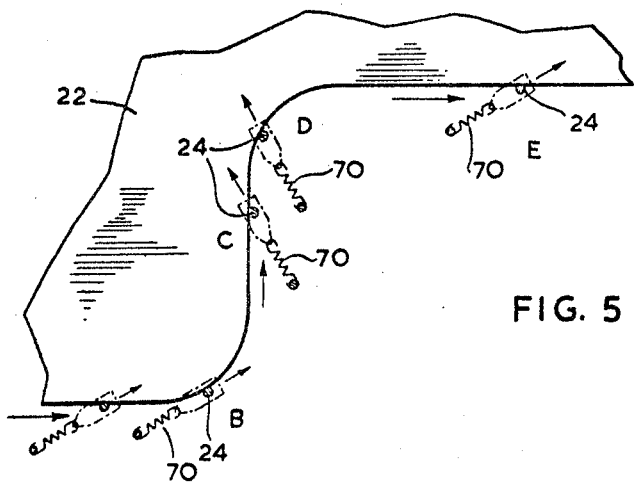
FIGURE 5 is a schematic indication of the operation of the device.

Referring now to FIGURE 5, when the stylus 24 moving along the pattern 22 reaches a location (B in FIGURE 8) where the pattern diverges in the counterclockwise direction therefrom (either because the pattern there curves in the counterclockwise direction, or because the table movement has caused the stylus tip to move slightly clockwise relative to the pattern), the stylus 24 under the bias of spring 70 will then deflect from the median position in the direction of the arrow tending to increase the speed of movement of tool and stylus relative to pattern and workpiece due to operation of one or both of valves 42 and 44. This deflection however, creates a corresponding (although converse) deflection of the socket 167 and of the plate 170 of the valve moving spool 161 to so connect the lines 94 and 96 to the lines 108 and 110 to cause the rotation of the hydraulic motor 92 in a direction to alter the orientation of arm 68 and spring 70 counterclockwise, rotating the bias on the stylus in this direction and causing the workpiece and pattern table to move in a speed and direction under the control by the stylus of the X and Y valves 42 and 44, so that stylus and tool move relatively to pattern and workpiece in a counterclockwise direction and this coordinated movement of the orientation arm 70 and of the table continue until the stylus is deflected back to the predetermined angle as in location C by the pattern meeting the stylus at an angle of approach within the desired range.

When the direction of travel of the stylus tip tends to diverge relatively counterclockwise from the pattern location (location D) or the relative pattern direction tends to diverge clockwise from the stylus (in both cases causing the stylus to encounter the pattern at a more nearly perpendicular angle) or if in the operation described in the preceding paragraph, the stylus strikes the pattern at greater than the design angular range, then the stylus is moved by the pattern against the bias of spring 70 toward the neutral position, and the median position of the spool 16 in the valve 112 is passed under the bias of spring 173 because of the movement of plate 170 toward perpendicular orientation, and hence the flow to the motor 92 is reversed from that previously described and the lines 94 and 96 are now connected to lines 108 and 110 in such a way as to cause the motor 92 to rotate in a direction to rotate the biasing spring 70 in a clockwise direction, followed by consequent relative movement and speed of stylus and tool caused by the stylus control of the X and Y valves until the bias of stylus 24 by spring 70 is sufficiently increased to call for the workpiece table to move in a direction which will move the stylus in the clockwise direction to the pattern with corresponding operation and movement of the tool relative to the workpiece and to return the approach of the stylus to an approach angle (as in position E) to the stylus, within the desired range.

It will be realized that if such clockwise rotation is sufficient that the angle of the stylus 24 tends to approach the workpiece at an angle clockwise of the desired angular range, then the spring will bias the stylus (due to the absence of resistance of the pattern) sufficiently to cause the spool 161 to pass the median position of valve 112 to cause the spool to connect lines 108 and 110 to the supply and return, in such a way that the bias 70 is rotated counterclockwise tending to return the approach range of stylus 24 to the pattern at an angle within the desired range.

In this way, the co-ordination of the well known X and Y control both in speed and direction by the stylus and the resultant movement of the workpiece table together with the rotation of the bearing spring 70 under control of the stylus deflection, will cause the tool under the control of the stylus to progress completely 360 degrees (in a mean counterclockwise direction) about a pattern and to follow variations in deviation of the pattern as and when called for.

The design of valve 112 and of the relative movement of sleeve 152 and spool 161 is shown so that the smallest relative movement of spool to sleeve on either side of the median position, will cause the hydraulic motor 92 to move in one or the other direction. It will be realized, however, that the valve could be so designed that there was a predetermined relative position for spool and sleeve (where rotation of motor 92 in one direction would be initiated) spaced from a different relative position for spool and sleeve (where rotation of motor 92 in the other direction would be initiated) and where between such relative positions no rotation of the motor will take place. The result is that, with such valve design, there would be a definite range of deflections of stylus 24, wherein no rotation of the motor 92 would take place, with correcting rotation of the motor 92 in one direction for deflections above said range and in the other direction for deflections below said range. Although such design is within the scope of the invention, it is felt that the lack of sensitivity of such arrangement would considerably limit its possible application.

I claim:

1. In a control for hydraulically operated machines wherein the relative movements between a tool and a workpiece correspond to relative movement between a tracer and a pattern to be reproduced, comprising:

means for controlling such relative movements;

a stylus mounted to form the operative part of said tracer and arranged to contact and be deflected by said pattern;

said stylus being connected to said means for controlling relative movements so that when deflected, said relative movements are controlled so that the resultant relative movement between said tracer and the pattern, is substantially in the direction of said deflection;

means rotatably mounted on said tracer head for biasing said stylus in a predetermined direction, relative to said means;

orientation control for said biasing means;

means responsive to the amount of deflection of such stylus from a neutral position operable:

in response to said deflection exceeding a predetermined amount for causing said orientation control to rotate said biasing means in one direction; and in response to said deflection being less than a predetermined amount for causing said orientation control to rotate said biasing means in the other direction;

wherein a spool valve is mounted adjacent said stylus; said spool valve having a spool relatively slidable in a sleeve in a range of movement on each side of a median location therein;

means are provided responsive to movement of said spool on one side of said median location, for moving said orientation control in one direction, and responsive to movement of said spool on the other side of said median location for moving said orientation control in the other direction;

and means are provided mechanically coupling said stylus to said valve designed and constructed so that:

movement of said stylus to greater than a predetermined deflection causes said spool to move to said one side of said median location, and movement of said stylus to less than a predetermined deflection causes said spool to move to said other side of said median location.

2. A device as claimed in claim 1 including adjustment means operable to vary the value of the predetermined deflections which cause said spool to move to the one and to the other side of said median position.

3. In a control for hydraulically operated machines wherein the relative movements between a tool and a workpiece correspond to relative movement between a tracer and a pattern to be reproduced; comprising:

a first valve connected to control relative movement of tool and workpiece in one direction;

a second valve connected to control relative movement of tool and workpiece in a direction perpendicular to said one direction;

a stylus mounted to form the operative part of said tracer and arranged to contact and be deflected by said pattern;

said stylus being connected so that when deflected, said first and second valves are controlled to the extent necessary to produce relative movement in said two directions such that the resultant relative movement is in the direction of said deflection;

means rotably mounted on said tracer head for biasing said stylus in a predetermined direction, relative to said means;

orientation control for said biasing means;

means responsive to the amount of deflection of such stylus from a neutral position, operable in response to such deflection exceeding a predetermined amount for causing said orientation control to rotate said biasing means in one direction;

and in response to said deflection being less than a predetermined amount causing said orientation control to rotate said biasing means in the opposite direction;

wherein a spool valve is mounted adjacent said stylus; said spool valve having a spool relatively slidable in a sleeve in a range of movement on each side of a median location therein;

means are provided responsive to movement of said spool on one side of said median location, for moving said orientation control in one direction, and responsive to movement of said spool on the other side of said median location for moving said orientation control in the other direction;

and means are provided mechanically coupling said stylus to said valve designed and constructed so that: movement of said stylus to greater than a predetermined deflection causes said spool to move to said one side of said median location, and movement of said stylus to less than a predetermined deflection causes said spool to move to said other side of said median location.

4. A device as claimed in claim 3 including adjustment means operable to vary the value of the predetermined deflections which cause said spool to move to the one and to the other side of said median position.

5. In a control for hydraulically operated machines wherein the relative movements between a tool and a workpiece correspond to relative movement between a tracer and a pattern to be reproduced, comprising:

means connected to control relative movement of tool and workpiece in one direction;

means connected to control relative movement of tool and workpiece in a perpendicular direction;

a stylus mounted to form the operative part of said tracer and arranged to contact and be deflected by said pattern;

said stylus being connected so that when deflected, said first and second control means are controlled to the extent necessary to produce relative movement in said two directions such that the resultant relative movement of said stylus relative to said pattern is in the direction of said deflection;

means rotatably mounted on said tracer head for biasing said stylus in a predetermined direction, relative to said means;

an orientation control for said biasing means;

means for measuring the amount of deflection of said stylus from a neutral position;

and operable in response to said deflection exceeding a predetermined amount, to cause said orientation control to rotate said biasing means in one direction;

and operable in response to said deflection being less than a predetermined amount to cause said orientation control to rotate said biasing means in the opposite direction;

wherein a spool valve is mounted adjacent said stylus, said spool valve having a spool relatively slidable in a sleeve in a range of movement on each side of a median location therein;

means are provided responsive to movement of said spool on one side of said median location, for moving said orientation control in one direction, and responsive to movement of said spool on the other side of said median location for moving said orientation control in the other direction;

and means are provided mechanically coupling said stylus to said valve designed and constructed so that: movement of said stylus to greater than a predetermined deflection causes said spool to move to said one side of said median location, and movement of said stylus to less than a predetermined deflection causes said spool to move to said other side of said median location.

6. A device as claimed in claim 5 including adjustment means operable to vary the value of the predetermined deflections which cause said spool to move to the one and to the other side of said median position.

7. In a control for hydraulically operated machines wherein the relative movements between a tool and a workpiece correspond to relative movement between a tracer and a pattern to be reproduced, comprising:

means for controlling such relative movements;

a stylus mounted to form the operative part of said tracer and arranged to contact and be deflected by said pattern;

said stylus being connected to said means for controlling relative movements so that when deflected, said relative movements are controlled so that the resultant relative movement between said tracer and the pattern, is substantially in the direction of said deflection;

means rotatably mounted on said tracer head for biasing said stylus in a predetermined direction, relative to said means;

orientation control for said biasing means;

means responsive to the amount of deflection of such stylus from a neutral position operable:

in response to said deflection exceeding a predetermined amount for causing said orientation control to rotate said biasing means in one direction; and in response to said deflection being less than a predetermined amount for causing said orientation control to rotate said biasing means in the other direction;

wherein a spool valve is mounted adjacent said stylus, said spool valve having a spool relatively slidable in a sleeve in a range of movement on each side of a median location therein;

and means are provided mechanically coupling said stylus to said valve designed and constructed so that: movement of said stylus to greater than a predetermined deflection causes said spool to move to said one side of said median location, and movement of said stylus to less than a predetermined deflection causes said spool to move to said other side of said median location;

wherein said valve is connectible between a reversible hydraulic motor and means for supplying hydraulic fluid in such manner that location of said spool on one and the other side of said median position will cause said hydraulic motor to rotate in one and the other direction, respectively, and a drive from said hydraulic motor to said rotatably mounted biasing means, designed to rotate said biasing means in said one direction in response to said deflection being greater than a predetermined amount and to rotate said biasing means in said other direction in response to said deflection being less than a predetermined amount.

8. In a control for hydraulically operated machines wherein the relative movements between a tool and a workpiece correspond to relative movement between a tracer and a pattern to be reproduced; comprising:

a first valve connected to control relative movement of tool and workpiece in one direction;

a second valve connected to control relative movement of tool and workpiece in a direction perpendicular to said one direction;

a stylus mounted to form the operative part of said tracer and arranged to contact and be deflected by said pattern;

said stylus being connected so that when deflected, said first and second valves are controlled to the extent necessary to produce relative movement in said two directions such that the resultant relative movement is in the direction of said deflection;

means rotatably mounted on said tracer head for biasing said stylus in a predetermined direction, relative to said means;

orientation control for said biasing means;

means responsive to the amount of deflection of such stylus from a neutral position, operable in response to such deflection exceeding a predetermined amount for causing said orientation control to rotate said biasing means in one direction;

and in response to said deflection being less than a predetermined amount causing said orientation control to rotate said biasing means in the opposite direction;

wherein a spool valve is mounted adjacent said stylus, said spool valve having a spool relatively slidable in a sleeve in a range of movement on each side of a median location therein, and means are provided mechanically coupling said stylus to said valve designed and constructed so that: movement of said stylus to greater than a predetermined deflection causes said spool to move to said one side of said median location, and movement of said stylus to less than a predetermined deflection causes said spool to move to said other side of said median location;

wherein said valve is connectible between a reversible hydraulic motor and means for supplying hydraulic fluid in such manner that location of said spool on one and the other side of said median position will cause said hydraulic motor to rotate in one and the other direction, respectively;

and a drive from said hydraulic motor to said rotatably mounted biasing means, designed to rotate said biasing means in said one direction in response to said deflection being greater than a predetermined amount and to rotate said biasing means in said other direction in response to said deflection being less than a predetermined amount.

9. In a control for hydraulically operated machines wherein the relative movements between a tool and a workpiece correspond to relative movement between a tracer and a pattern to be reproduced, comprising:

means connected to control relative movement of tool and workpiece in one direction;

means connected to control relative movement of tool and workpiece in a perpendicular direction;

a stylus mounted to form the operative part of said tracer and arranged to contact and be deflected by said pattern;

said stylus being connected so that when deflected, said first and second control means are controlled to the extent necessary to produce relative movement in said two directions such that the resultant relative movement of said stylus relative to said pattern is in the direction of said deflection;

means rotatably mounted on said tracer head for biasing said stylus in a predetermined direction, relative to said means;

an orientation control for said biasing means;

means for measuring the amount of deflection of said stylus from a neutral position;

and operable in response to said deflection exceeding a predetermined amount, to cause said orientation control to rotate said biasing means in one direction;

and operable in response to said deflection being less than a predetermined amount to cause said orientation control to rotate said biasing means in the opposite direction;

wherein a spool valve is mounted adjacent said stylus;

said spool valve having a spool relatively slidable in a sleeve in a range of movement on each side of a median location therein, and means are provided mechanically coupling said stylus to said value designed and constructed so that: movement of said stylus to greater than a predetermined deflection causes said spool to move to said one side of said median location, and movement of said stylus to less than a predetermined deflection causes said spool to move to said other side of said median location;

wherein said valve is connectible between a reversible hydraulic motor and means for supplying hydraulic fluid in such manner that location of said spool on one and the other side of said median position will cause said hydraulic motor to rotate in one and the other direction, respectively, and a drive from said hydraulic motor to said rotatably mounted biasing means, designed to rotate said biasing means in said one direction in response to said deflection being greater than a predetermined amount, and to rotate said biasing means in said other direction in response to said deflection being less than a predetermined amount.

No references cited.

WILLIAM W. DYER, JR., *Primary Examiner.*

G. A. DOST, *Assistant Examiner.*